April 2, 1963        W. B. LUTON        3,083,473

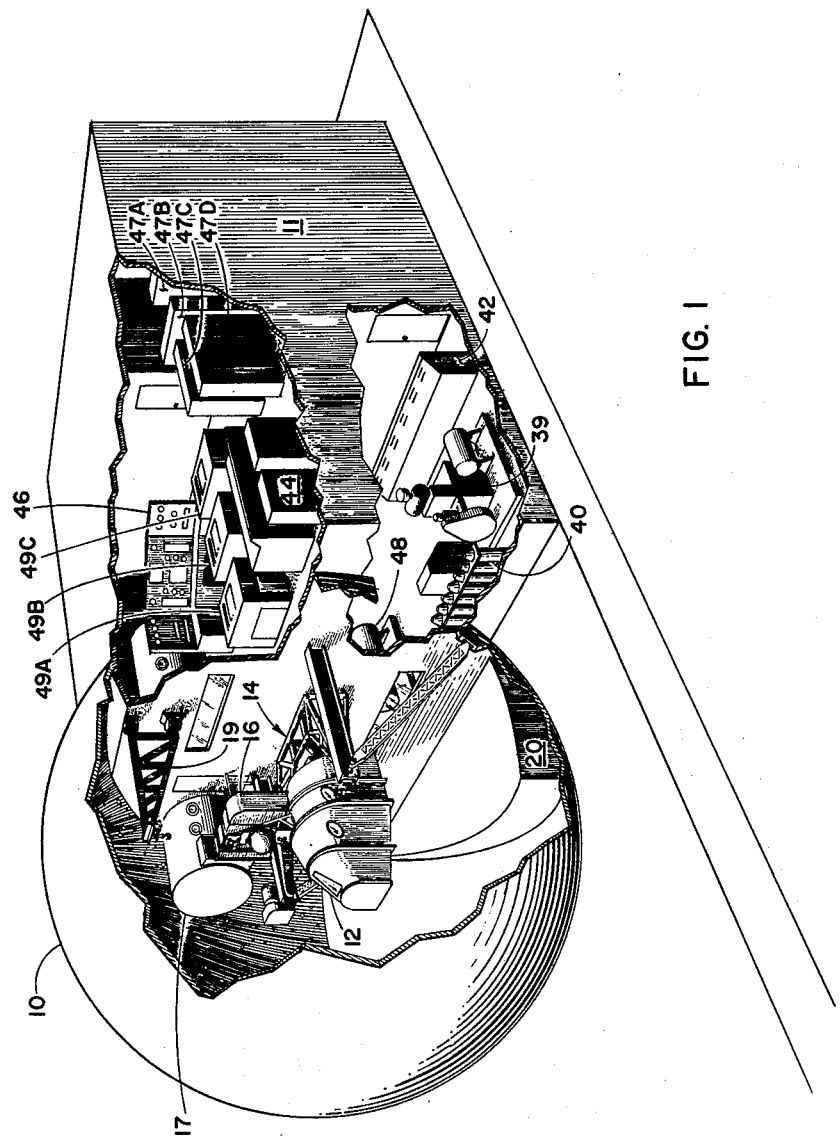

SPACE FLIGHT ENVIRONMENTAL SIMULATOR

Filed June 20, 1960        2 Sheets-Sheet 2

*INVENTOR.*
WILLIAM B. LUTON

BY *Theron H. Nichols*

AGENT

United States Patent Office 3,083,473
Patented Apr. 2, 1963

3,083,473
SPACE FLIGHT ENVIRONMENTAL SIMULATOR
William B. Luton, Dallas, Tex., assignor, by mesne assignments, to Ling-Temco-Vought, Inc., Dallas, Tex., a corporation of Delaware
Filed June 20, 1960, Ser. No. 37,265
3 Claims. (Cl. 35—12)

This invention pertains to a space flight environmental simulator. More specifically the disclosed invention comprises a moving-base flight and environmental simulator usable for boost-orbit-glide flight investigation in training which has the capability of simulating various types of vehicles in various types of space flights including closed-loop control of the flight mechanics of the vehicle through an analogue-digital computer and mounting a gondola for rotation about offset axes corresponding to the center of gravity of the simulated space vehicle to stimulate short period flight dynamics superimposed on the acceleration fields associated with boost, burnout, and glide accompanied with oscillatory accelerations, vibrations, moving horizon, cabin heat and pressure, cabin atmosphere mixture, and noise.

Before man ventures into space as an active member of any man-machine system, a thorough knowledge must be available as to his capability to control and navigate the vehicle adequately throughout the entire mission profile and to cope with emergency situations. The degradation of his performance under the combined stresses of such factors as noise, vibration, acceleration, temperature, internal atmosphere, humidity, pressure, etc., must be thoroughly investigated and then compensated for insofar as practicable by optimal integration of the man with the machine. Also, crew evaluation and selection and crew training for so expensive a venture should be based upon as realistic an equivalent of actual space flight as possible. Actual in-flight space training is impractical and since the veteran space voyager will probably be retired after only a few missions, his total actual space flight experience will be brief. To ensure that the man-machine system is optimal, that the best crew is selected, and that the crew is adequately experienced in the ways of space flight and the particular machine, a sophisticated flight control-navigation-environment simulator is required and disclosed herein.

In view of the disclosed space flight simulator, to build a separate near-total simulation facility for every type of space craft is unnecessary. Many of the parameters are the same for all types of craft and missions, and many others differ so slightly that the apparatus is readily convertible to each configuration. Therefore, the instant invention is a universal simulator facility which can evaluate space craft configurations and which can train crews for many years to come. This device can simulate the more significant parameters of the entire mission of any spacecraft from a one-man orbital vehicle to a three-man voyaging space ship. This general-purpose space simulation laboratory constitutes a research tool of the same general category as wind tunnels, computer laboratories and human centrifuge facilities.

The disclosed moving base simulator is capable of simulating the entire flight from the preflight countdown to the landing touchdown. It includes closed loop control (with both long and short period dynamics), navigation, and all of the essential psychological and physiological stimuli, such as the proper direction of all acceleration fields (not magnitude), oscillatory accelerations, vibration, noise, heat, pressure, atmospheric mixture, lighting, and the significant external visual stimuli (i.e., earth horizon).

While various aircraft trainers have been developed such as those disclosed in U.S. Patents 1,393,456; 1,925,180; 2,357,481; 2,409,938; 2,485,266; and 2,524,258, no trainers, particularly the above cited trainers, simulate the present day space vehicles primarily because the problems of space flight were not apparent at that time. All of these prior trainers have the same inadequacies, they fail to provide realistic translation and rotational motion of the occupants of a vehicle with its C.G. (center of gravity) spaced from the cockpit or gondola, i.e., the point of intersection of the three axes of rotation of the gondola must be spaced from the gondola.

A primary object of this invention is to provide a device that will simulate space flight i.e., movements, accelerations, and environments of space in the present and future space vehicles.

Another object of this invention is to provide a space flight simulator that will simulate short period oscillatory accelerations associated with the short period flight dynamics of a space vehicle in which the occupants are positioned either, as in the usual case, well forward, or as in rare cases well behind the center of gravity of the vehicle.

A further object of this invention is to provide a space flight simulator comprising an occupant carrying gondola so mounted that its three axes of rotation intersect at a point spaced from the gondola to produce realistic translation and rotational motion of the occupants.

A still further object of this invention is to provide a space flight environment simulator that simulates all the common environmental conditions of space flight, noises, vibrations, accelerations, and variations in temperature, humidity, and pressure, and which also provides a realistic translation and rotational motion of the occupants by having the three axes of rotation of the gondola intersect at a point spaced from the gondola.

Other objects and various advantages of the disclosed space flight environmental simulator will be apparent from the following detailed description, together with the accompanying drawings, submitted for purposes of illustration only and not intended to define the scope of the invention, reference being had for that purpose to the subjoined claims.

Briefly, this invention comprises a space flight environmental simulator comprising a gimbal system having the roll, yaw, and pitch axes intersect well aft of the occupant carrying gondola whereby short period translational and rotational realistic motions are provided; a yoke system for pivoting the gimbal system to the proper direction of the acceleration fields throughout the space flight; an environmental system for generating the various environmental stresses encountered in space flights as noise, vibration, temperature, internal atmosphere and pressure, and lighting; a space cabin attachable to the gondola to simulate flight subsequent to the boost portion of take-off, a planetarium type star field/sun/earth/moon projection system; and various equipment for generating controlling signals for operating the environmental simulator.

The drawings diagrammatically illustrate by way of example, not by way of limitation, one form of the invention wherein like reference numerals designate corresponding parts in the several views in which:

FIG. 1 is a detailed perspective cutaway view of the space flight environmental simulator facility;

Figure 3:
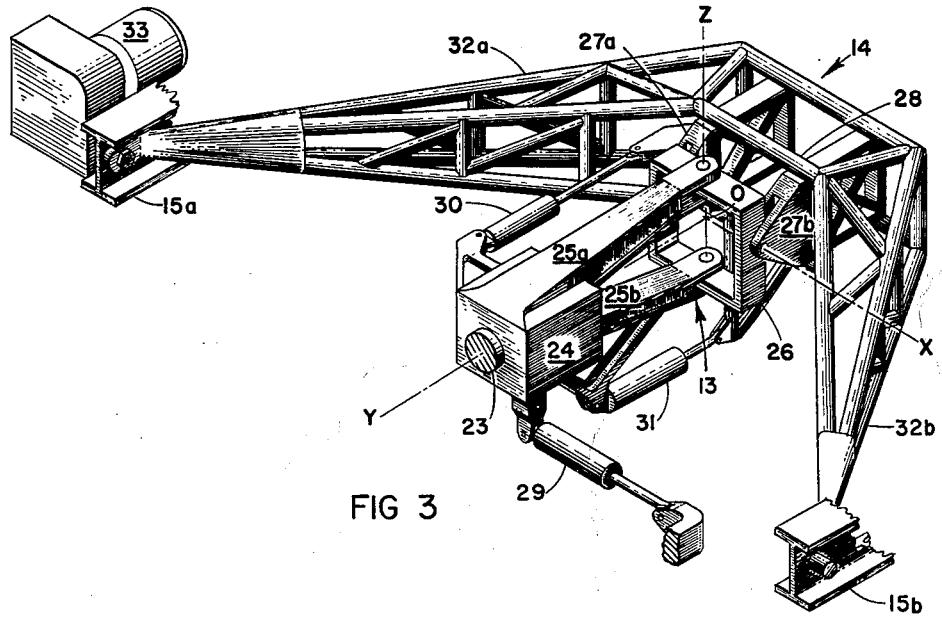
FIG. 3 is a detailed perspective of the mounting for providing six degrees of freedom and a movable base for the gondola.

The invention disclosed herein is not limited in its application to the method and details of construction and arrangement of parts shown and described, since the invention is capable of other embodiments and of being practiced or carried out in various other ways. Also it is to be understood that the phraseology or terminology employed herein is for the purpose of description and not of limitation.

The role to be played by our space vehicles in pioneering space exploration involves missions which require the crew to perform complex tasks in surroundings which are largely unfamiliar to them and under the unknown physiological and psychological stresses associated with space flight. Confronting the crew on their first space mission are the following situations: The control to be executed, the decisions to be made, and the tasks to be performed, all in an environment of unfamiliar physical and mental stresses. This first flight would be equivalent to operating a new high performance aircraft through its entire capability envelope on its first flight entirely on instruments. To accomplish this task, adequate crew training prior to flight must be provided to make as many of the unfamiliar parameters as routine as practicable.

The most effective training that can be provided is a real-time demonstration of the entire mission under simulated conditions which duplicate insofar as is practicable the actual conditions. The approach on space programs to date has been a piecemeal simulation of one parameter and then another, so that continuity is lost and combined effects are left to speculation. A sophisticated flight and environment simulator which combines as many of the parameters as possible under closed loop flight conditions would enable adequate training and evaluation of crew capability for orbital missions. The simulator, disclosed hereinafter, accomplishes this objective.

The Facility

While various facilities may be utilized, FIG. 1 discloses the preferred complete facility for the space flight environmental simulator, completely housed in a spherical dome 10, approximately forty feet in diameter attached to a two story building 11 forty feet square. In the center of the dome is the moving base pressure tight gondola 12 which duplicates the space vehicle's flight control station. A gimbal ring structure 13, FIGS. 2 and 3, rotatably supports the gondola and a yoke support structure 14 rotatably mounted on beams 15a, 15b supports the gimbal ring. A telescoping airlock or tunnel 16 detachably connects the gondola with a space cabin laboratory 17. A servo driven planetarium 18 is mounted atop the gondola to provide a projection of the vision field external of the space craft. If so desired, a hoist 19 and a dock 20 may be provided.

In the building 11 is housed the machines for controlling and producing various environmental conditions in the gondola described in greater detail hereinafter.

This entire facility is completely versatile in that it would be adaptable to any space craft configuration from a single-man orbital craft to a three-man space voyaging craft, ballistic or lifting, and would be likewise adaptable to any mission within the capability of these craft. The computer described hereinafter is designed for universal application and the parameters and functions may be changed or reset to conform to the particular vehicle under study. The gondola and all apparatus associated with it are independent of the apparatus associated with the space cabin. While the two units may be used separately, when used together they form a unitary and complete space vehicle.

Gondola

Figure 2:
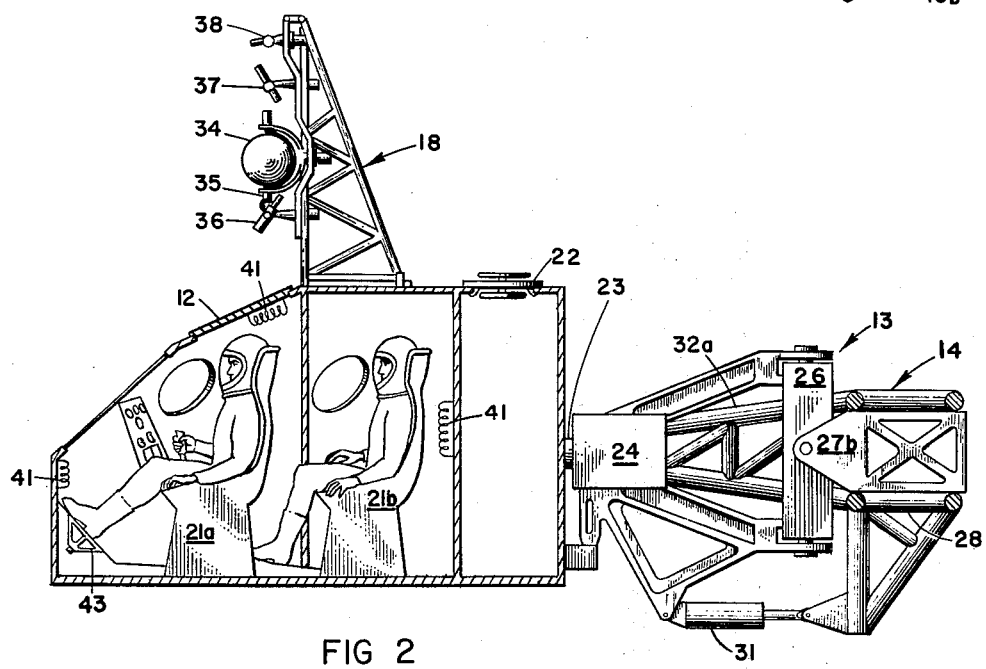
FIG. 2 is a profile view, partly in section of a gondola and a mounting therefor, with parts removed for clarity of disclosure.

The gondola 12, the space vehicle crew's flight control station, FIG. 2 particularly, consists of a pressure-tight shell capable of withstanding a vacuum of 10 p.s.i. differential and housing a three-man crew, the two side-by-side back seats 21b behind front seat 21a being side-by-side. One or two seat gondolas may be substituted for the disclosed three seat gondola if so desired.

The preferred gondola contains the instruments, controls, and general cockpit arrangement of the space vehicle being simulated.

The tunnel 16 is mounted on top of the gondola with a pressure-tight hatch 22 connected therebetween and forms an air-lock for passage from the gondola to the space cabin 17, the latter having a similar pressure-tight hatch at the position of connection with the tunnel.

The illustrated displays, controls, seats, crew-restraining apparatus, windows, etc. are changeable in configuration and function to those of the space vehicle being simulated. The upper segment of the gondola's shell 12, the gondola cap, is removable to allow installation and replacement of the cockpit furnishings. Also, the removable segment may be replaced by gondola caps having different window and internal configurations to duplicate those of any specific craft.

Tests indicate in the conventional center stick and rudder pedals control system that rudder control becomes ineffective when the pilot experiences an acceleration of approximately 6 "G" while wrist and finger control are effective beyond accelerations of 12 "G." Accordingly, the preferred control system utilized is the three axis side controller disclosed in Patent No. 3,011,739 dated December 5, 1961 in which I am a co-inventor.

Moving Base

A moving base gimbal ring mounting for the gondola is shown in FIG. 1 and is disclosed in greater detail in FIG. 3.

The gimbal ring structure 13 provides three degrees of freedom for the simulator in all phases of the simulated space flight—boost, orbit, re-entry, glide, approach, and landing. The yoke structure 14 which supports the gimbal ring structure 13 provides a moving base whereby the proper direction of the acceleration forces existing at all times as well as the translational motions due to vehicle short period dynamics are applied to the gondola.

The gimbal ring structure 13 comprises a stud shaft 23 integral with the aft end of the gondola on a longitudinal Y axis and protruding rearwardly into a base structure 24 whereby the gondola may rotate about the Y axis in the base structure. Upper and lower arms 25a and 25b are fixedly secured at one of their ends to the base structure 24 and pivotally secured on a vertical Z axis at their other ends to the top and bottom portions, respectively, of a ring 26, whereby the base structure and the gondola may rotate about the Z axis. Two bifurcated studs 27a, 27b integral with the center section 28 of the yoke 14 pivotally support the ring 26 about a horizontal transverse X axis, whereby the base structure and the gondola may rotate about the X axis. The three axes X, Y, and Z and their point of intersection O illustrated approximate the X, Y, and Z axes and the center of gravity, respectively, of the space vehicle being simulated.

A suitable roll actuator or servo 29, such as but not limited to an electro-hydraulic servo is pivotally connected between a stud on the bottom of the base structure 24 and a stud on the back of the gondola for rotation of the gondola about the Y axis. Likewise, a similar yaw servo 30 is pivotally connected between a stud on the side of base structure 24 and a stud on the center section 28 for rotation of the gondola about the Z axis, and a similar pitch servo 31 is pivotally connected between a stud on the bottom of the base structure and a stud on the center section 28 for rotation of the gondola about the X axis.

Yoke 14 comprises a rigid structure having two arms 32a, 32b extending outwardly and forwardly from the center section 28, the outer ends of the arms being pivotally supported about a transverse axis and connected to the supporting beams 15a, 15b, respectively. A worm motor servo 33, or the like, is connected to one arm 32a at its pivotal connection for rotating the yoke about its transverse axis and accordingly raises and lowers and changes the attitude of the yoke center section 28 as well as the gondola and its gimbal ring structure.

The electrically actuated hydraulic servos are responsive to computer outputs, described hereinafter, for torqueing the gondola about the point of intersection of the three axes or the simulated center of gravity of the space vehicle to provide a realistic combination of translational and rotational motions about the roll, pitch and yaw axes. In addition, the worm motor, responsive to the computer outputs, positions the longitudinal axis of the assembly so that the gravity axis of the gondola is in the direction of the acceleration fields to be encountered in flight.

For example, the gondola is rotated to the nose-up or vertical position for the boost phase of the simulated flight. Upon burnout, the gondola is rotated to the horizontal position and during the glide it is positioned in a nose-down attitude as a function of angle-of-attack and drag so that the gravity axis coincides with the direction of the total acceleration field. Therefore, the oscillatory accelerations associated with the short-period flight dynamics are superimposed on the acceleration fields associated with boost and glide which are realistic in direction though not in magnitude.

Planetarium

The vision field external to the space craft as supplied by the planetarium 18 provides stimuli which are of great value in evaluating the performance of the crew and the machine. The most important of these is an artificial earth horizon, so necessary to evaluating stability and control characteristics. Next in importance are stars, planets, and moon for space orientation and navigation. The planetarium features of the simulator facility provide these stimuli.

A star-field projector 34 is a gimbaled sphere containing a point source of light and perforations for projecting all stars, through the fourth magnitude. Also included are diffusers for projecting the Milky Way and stellar clouds. Suitable gimbal pivots are driven by servos 35 which position the star field according to signals generated in the computer described hereinafter.

The earth projector 36 is likewise gimbaled and positioned by the computer. Another servo governs the size of the earth's orb as a function of altitude and ranges from an eye-level horizon to an orb such as would be seen from the moon.

The moon projector 37 is similar to the earth projector. The sun projector 38 is similar to the earth projector except that it projects a fixed-diameter orb. One or more of the visible planets may be added if needed for navigational aid.

Since the planetarium projectors are attached to the gondola, actual translational motion of the gondola moves the star field so that no apparent motion relative to the stars or horizon exists except those rotational motions about the gondola axes called for by the computer. The rotation of the gondola to any inclined position occurs about the pilot's eye and about the center of the dome so that no change in perspective occurs.

Space Cabin

Atop the gondola is the pressure tight hatch 22, FIG. 2, for egress and ingress of the tunnel 16, FIG. 1, from the gondola. The tunnel connects with the space cabin 17 which is utilized at the conclusion of the boost phase of the space flight.

Simulating a complete mission of long duration such as an orbital reconnaissance flight or a voyage to the moon requires a chamber suitable for injecting artificial atmospheres, heat, and pressure and capable of housing the various furnishings of a space ship. A typical simulator facility includes such a cabin eight feet in diameter and twenty-five feet in length. The furnishings may include conventional galley, bunk, toilet, lockers, and work stations. The cabin is soundproofed to prevent noises external to the cabin from influencing the crew. Portholes containing one-way glass permit observation from the outside.

Various balanced biological systems can be included for evaluation. The great variety of such systems dictates that they be adapted to the cabin on an individual basis.

The gondola and space cabin are used as a single vehicle in the preferred sense, as for simulation of large vehicle, long term space missions. In special cases, however, the gondola and space cabin may be utilized separately and individually, if so desired.

Environmental Generators

The environmental stresses of various space missions are reproduced in the gondola and cabin by suitable conventional environmental generators.

The gondola and cabin atmosphere in its principal elements of mixture, pressure, and humidity are generated by two systems of vacuum pumps, valves, and regulators 39, and oxygen-nitrogen supply bottles 40, one each for the gondola 12 and the cabin 17. The vacuum pumping system maintains the gondola and cabin at the desired cabin altitude. Mixtures of oxygen and nitrogen are supplied by the bottles and regulated in accordance with conventional gas analyzers in combination with the regulators. Humidity and carbon dioxide content are similarly regulated.

Re-entry heat is produced in both the gondola and cabin. The interior temperature is regulated by a system of conventional heating elements 41, three being illustrated in FIG. 2, coolers, and regulators and heat controls 42. Radiant heat is provided by heating the gondola and cabin walls to a maximum of 350° F. according to the heat load on the craft for simulation of the re-entry, etc. portions of the space flight.

The sounds to be encountered in flight are recorded on tapes and projected by loud speakers 43 in the gondola. The sounds can reach energy levels of 130 decibels and are programmed from the recorders 44 in building 11 according to the flight condition.

Vibrations up to 50 c.p.s. and $\frac{1}{16}$ inch double amplitude are programmed as a function of the flight condition by a signal-generating device which drives the seats' vibration base 21a, 21b.

Control Station

The master control station 46, FIG. 1, is a large console which contains all of the controls and monitoring apparatus required to direct the simulated flights. The central panel contains two closed-circuit television screens. Cameras in the gondola and space cabin project images to the screens, as selected at the control station, to provide close surveillance of the crew and instruments. Program instruction displays on either side of the screens provide instructions for directing the simulated flights and operating the equipment. Panels on either side of the central panel contain the instruments and controls required to sequence the operation of the equipment.

Computer

The entire simulator is driven by an analog/digital computer complex 47A–47D capable of computing, in real time, the flight mechanics in six degrees of freedom, the navigation equations, rotating earth, winds, programs for the environment generating systems, such functions as required by the work stations in the space cabin, and for operating the hydraulic pumps 48 for operation of the roll, yaw, pitch, and attitude changing servos. The equations of motion, aerodynamic and reaction control parameters, orbital mechanics, etc., are computed in a nearly total sense with only minor linearizations and compromises to simplify the apparatus. None of the parameters which might have a realizable effect on the crew is omitted.

The computer consists of:

a. Analog equipment for the solution of the equations of motion.
b. Real-time digital equipment for the solution of navigational equations.
c. Analog-digital conversion equipment.
d. Recording, data-reduction and crew-monitoring systems.
e. Cockpit-display drive systems.
f. Internal-environment computer control system.
g. Acceleration computer-control system.
h. Data-link simulation apparatus.
i. Planetarium drive system.
j. Cause-and-effect component-failure simulation.
k. Computer self-checking and warning system.
l. Computer and computer subsystems, power, cooling, and associated equipment.

*Recorders*

All of the essential parameters for crew monitoring and crew proficiency evaluation are continuously recorded during the flights by a multiplicity of recording apparatus 49A–49C. "XY" plotters track the altitude trajectory, energy profile, velocity profile, navigational track, etc. The recorders plot the time histories of the essential monitoring parameters. A limited number of the parameters is continuously recorded using automatic data reduction apparatus.

Standard variplotters and pen and tape recorders 49A–49C in the control station record all the essential parameters for crew monitoring and crew proficiency evaluation on a continuous basis.

*Safety*

Provisions are made to ensure against hazardous situations. The motions of the seat base and the moving base are limited in amplitude and frequency to prevent dangerous accelerations. The atmosphere mixture is continously monitored to ensure against exceeding human limits; both the crew and the control engineer have emergency bypass controls. The gondola and cabin pressure is made safe by adequate design margins and proof tests. The heating system is fused to avoid overload and the noise generating system is energy-limited to within human tolerances. When the air-lock is joined, the gondola is mechanically locked in place and hydraulic power is turned off to prevent breaking the air-lock. After the air-lock has been joined, the space cabin pressure is equalized with the gondola's pressure before the gondola's hatch is opened. A pressure sensing switch signals the crew when it is safe to open the hatch. The facility includes a medical station, a doctor or medical specialist being present during all operations.

In summary, a space flight environmental simulator has been disclosed comprising a gimbal system having the roll, jaw, and pitch axes intersect well aft of the pilot's gondola for providing realistic short period translational and rotational motions of the space vehicle; a yoke system for pivoting the gimbal system to the proper direction of the acceleration fields; a space cabin detachably connected to the gondola for occupancy subsequent to the boost phase of a simulated space flight; an environmental system for generating the principal environmental stresses, noise, vibration, temperature, internal atmosphere and pressure, and lighting; a planetarium type star field/sun/earth/moon projection system; and computer/generating equipment for operating the environmental simulator.

While only one embodiment of the invention has been shown in the accompanying drawing, it will be evident that various modifications may be possible in the arrangement and construction of the disclosed space flight environmental simulator without departing from the scope of the invention.

I claim:

1. A space flight simulator comprising,
   a gondola,
   support structure,
   a yoke having a central portion and a pair of forwardly extending arms mounted on said support structure for rotation about a transverse axis extending through the forward ends of the yoke arms,
   a gimbal structure mounting said gondola on the central portion of said yoke in a position extending forwardly from the yoke central portion between the yoke arms,
   means associated with said gimbal structure for rotating said gondola about pitch and yaw axes extending through said gimbal structure aft of said gondola whereby movement of the gondola about the pitch and yaw axes is adapted to provide simulation of the short period oscillatory accelerations associated with the short period flight dynamics of an entire space vehicle larger than said gondola, and
   means for rotating said yoke and said gondola about the transverse axis whereby the gravity axis of the gondola may be positioned in the direction of the acceleration fields to be encountered in space flight.

2. A space flight simulator comprising an occupant carrying gondola,
   supporting beams,
   a supporting yoke, said yoke having a center portion and arms, said arms extending from said center portion in substantially a forward direction, the outer ends of said arms being rotatably mounted about a transverse axis on said supporting beams,
   a gimbal structure for mounting said gondola on said yoke center portion with said gondola extending in a forwardly direction from said yoke center portion between said arms, and
   means for rotating said yoke and said gondola about said transverse axis whereby the gravity axis of the gondola may be positioned in the direction of the acceleration fields encountered in flight,
   said gimbal structure comprising means for mounting said gondola for rotation about a pitch axis spaced from said gondola in a direction opposite to said forwardly direction, means for mounting said gondola for rotation about a yaw axis spaced from said gondola in a direction opposite to said forwardly direction, and means for rotating said gondola about each of said pitch and yaw axes, whereby pitch and yaw movements of the gondola simulate pitch and yaw movements of a space vehicle.

3. A space flight simulator as recited in claim 2 wherein said pitch and yaw axes intersect at a point of intersection spaced from said gondola in a direction opposite to said forwardly direction.

References Cited in the file of this patent
UNITED STATES PATENTS 2,357,481     Mallon     Sept. 5, 1944
2,938,279     Hemstreet et al.     May 31, 1960